United States Patent [19]
Gordon

[11] Patent Number: 5,423,672
[45] Date of Patent: Jun. 13, 1995

[54] MOLDING DEVICE HAVING A RING-GATING AND HOLE FORMING VALVE GATE PIN

[75] Inventor: Edward A. Gordon, Dothan, Ala.

[73] Assignee: Sony Electronics Inc., Park Ridge, N.J.

[21] Appl. No.: 286,983

[22] Filed: Aug. 5, 1994

Related U.S. Application Data

[63] Continuation of Ser. No. 22,563, Feb. 25, 1993, abandoned.

[51] Int. Cl.$^6$ .............................................. B29C 45/23
[52] U.S. Cl. ................................... 425/564; 264/107; 425/566; 425/810
[58] Field of Search ............... 425/562, 563, 564, 565, 425/566, 810; 264/106, 107

[56] References Cited

U.S. PATENT DOCUMENTS

| | | | |
|---|---|---|---|
| 4,272,236 | 6/1981 | Rees et al. | 425/564 |
| 4,705,473 | 11/1987 | Schmidt | 425/566 |

FOREIGN PATENT DOCUMENTS

| | | |
|---|---|---|
| 051252 | 5/1982 | EPO . |
| 0106980 | 5/1984 | European Pat. Off. . |
| 0117510 | 9/1984 | European Pat. Off. . |
| 0264725 | 4/1988 | European Pat. Off. . |
| 0480223 | 4/1992 | European Pat. Off. . |
| 61438 | 5/1980 | Japan .................. 425/566 |
| 63-95923 | 4/1988 | Japan . |

OTHER PUBLICATIONS

Webster's Ninth New Collegiate Dictionary, 1986, p. 190.

*Primary Examiner*—Tim Heitbrink
*Attorney, Agent, or Firm*—Ronald P. Kananen

[57] ABSTRACT

In order to facilitate the formation of a plastic member with an aperture in a central portion thereof, a ring gating valve arrangement is provided with a multi-piston servo arrangement which enables a specially configured pin to be stepwisely reciprocated back and forth within a molding device. The pin is formed with a land at one end which is dimensioned and shaped to produce the required aperture. The pin further features a channel structure which includes an annular recess adapted to permit plastic to flow into the center of the mold cavity area when the pin is thrust to a predetermined location. After the cavity is filled with hot plastic, the pin is retracted to a position wherein the annular recess is located within a removable gate bushing and the shaped land is pulled up until it is appropriately located in the mold cavity area. As the injected plastic cools and solidifies, the shaped land acts as the aperture molding pin and forms a clean aperture in the molded part. After solidification, the pin is retracted and the mold is opened to permit the molded part to be ejected.

14 Claims, 13 Drawing Sheets

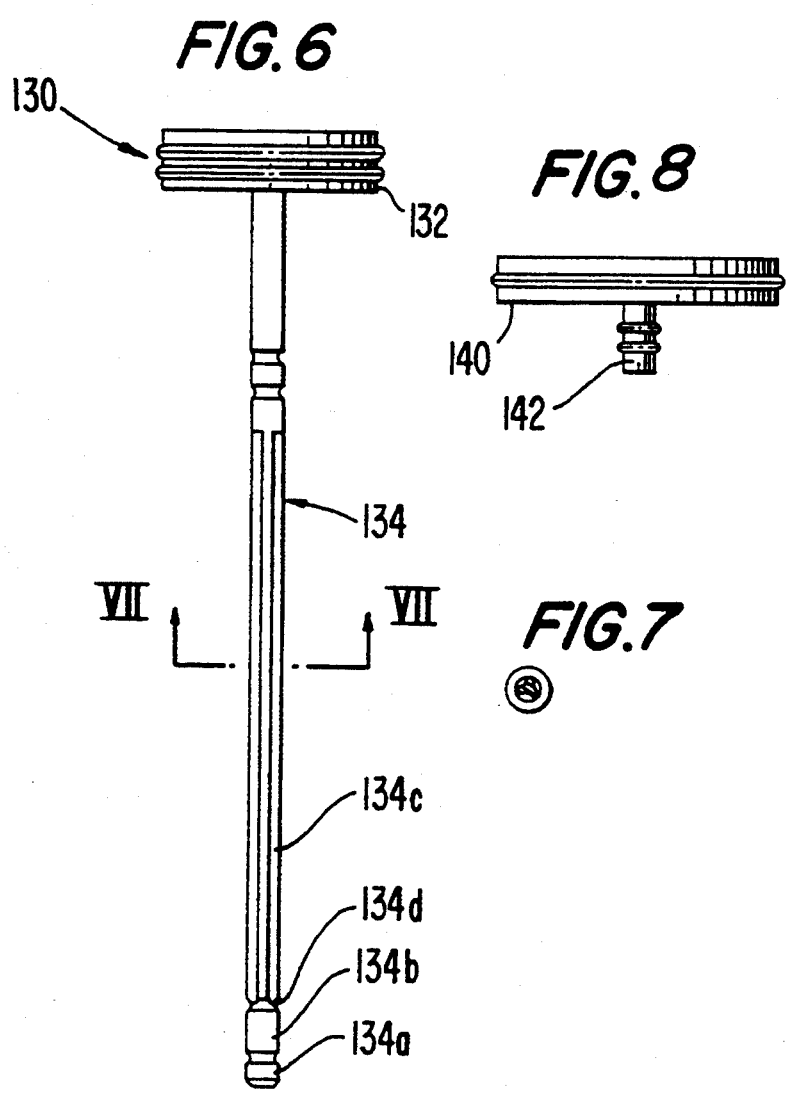

MOLDING DEVICE HAVING A RING-GATING AND HOLE FORMING VALVE GATE PIN

This application is a continuation of application Ser. No. 08/022,563 filed Feb. 25, 1993 now abandoned.

BACKGROUND OF THE INVENTION

1. Field of the Invention

The present invention relates generally to a ring gating technique and more specifically to an improved ring gating technique and apparatus which enables the formation of molded plastic products which have a clean through hole and which exhibit even stress and minimal flow marks.

2. Description of the Prior Art

Known mold gate systems are common in design and mode of operation. That is to say, hot plastic material is usually distributed through a hot manifold to a heated nozzle assembly. A valve gate pin within the heated nozzle is either hydraulically, pneumatically or mechanically retracted from a gate orifice in the mold cavity and hot plastic is injected therethrough into the mold cavity. After the cavity is filled, the valve gate pin is returned to its closed position wherein it seats against the gate orifice to cut-off the flow of plastic.

However, when the mold is opened and the plastic part is ejected, inevitably a "gate pin mark" impression can be seen on the surface of the part at the location where the plastic was injected.

The desired position for the injection mold gating of circular or square parts is usually in the center of the part. When a through hole is required to be formed at the center of the part, the gating must be offset from the center and use made of hot tip, cold runner, or gate valve techniques. However, these techniques tend to result in uneven filling, create molded-in part stress and a produce a weld line which originates at the core pin which forms the hole. Viz., as shown in FIGS. 1 and 2 the hot plastic flow (f) which is injected via a heated probe or conventional valve gate 1, enters a mold cavity 2 at a location or gate point (p) and separates (as indicated by the bold arrows) into two flows which pass around on either side of the projection or pin 3 which is used to form the required opening. When the two flow fronts meet on the other side of the pin, the undesirable weld line (w) is created.

Alternatively, instead of using the above mentioned offset injection technique, the part may be centrally gated in the area of the hole which is formed, using hot or cold multi-tipped edge gating in the manner illustrated in FIGS. 3 and 4. However, this technique results in a less than perfect surface at each gate point and also produces flow lines in the molded part originating between the individual gate locations. Viz., as illustrated in FIG. 4, a number of flow or weld lines are created by the multiple flows of plastic which result from injection by way of a sprue 4 having multiple sub-gates. Viz., as shown, in the case wherein the sprue has three sub-gates, three separate flows are produced within the mold cavity. Upon the flow fronts meeting one another, three flow or weld lines are produced.

A more laborious and less desirable technique of producing the above type of perforate part involves molding the part without the hole and then forming the opening using a separate drilling or punching operation. While this generally solves the flow line problem, it introduces the need for a number of additional operations to be performed and thus increases the cost of the article.

SUMMARY OF THE INVENTION

It is an object of the present invention to enable plastic to be injected by way of "ring gating" into a mold cavity using a modified gate technology which enables the formation of a molded part exhibiting even stress, a clean through hole and no flow marks.

This technique finds application in single or multiple cavity plastic molds designed to produce molded parts with through holes in or near the center of the same and which can be filled through the use of a single injection point within the cavity.

In brief, the above object is achieved by a ring gating valve arrangement which includes a multi-piston servo arrangement which enables a specially configured pin to be stepwisely reciprocated back and forth within a molding device. The pin is formed with a land at one end which is dimensioned and shaped to produce the required aperture. The pin further features a channel structure which includes an annular channel adapted to permit plastic to flow into the center of the mold cavity area when the pin is thrust to a predetermined location. After the cavity is filled with hot plastic, the pin is moved to a position wherein the annular channel is located within a gate bushing and thus cuts off the supply of plastic while the shaped land assumes a position wherein it is appropriately located in the mold cavity area. As the injected plastic cools and solidifies, the shaped land acts as the aperture molding pin and forms a clean aperture in the molded part. After solidification, the pin is retracted and the mold is opened to permit the molded part to be ejected.

Thus, some of the more prominent features of the invention are provided in that:

1) the gate pin is axially movable to a position wherein a gate orifice is open and plastic is permitted to flow into the molding cavity;
2) the gate pin is axially movable to a position wherein the plastic flow is cut-off;
3) a portion of the gate pin is used as a molding pin which forms the aperture in the part being molded;
4) the gate pin is connected with an actuating device which allows the pin to be selectively moved axially between the positions wherein injection and molding can take place.

More specifically, a first aspect of the present invention is provided in a molding device which features: means defining a cavity in which a part can be molded; a reciprocal pin; a land formed at a location proximate an end of the pin, the land being so shaped and sized so that when the pin assumes a first predetermined position, the land cooperates with the cavity defining means in a manner wherein it acts as a molding pin and forms an aperture in a part which is formed by injecting a flow of molten material into the cavity; channel means formed on the pin, the channel means allowing a flow of the molten material to enter the cavity when the pin assumes a second predetermined position; and servo means operatively connected with the pin for selectively moving the pin between the first and second predetermined positions.

A second aspect of the present invention is provided in a molding device which features: an axially displaceable pin; a first bushing disposed on a first side of a cavity which is defined between first and second structural elements which are relatively movable with respect to one another, the first bushing being disposed in the first structural member and adapted to guide the pin into the cavity; a second bushing adapted to receive the pin after it has been displaced by a predetermined amount through the cavity, the second bushing being disposed with the second structural member and on a second side of the cavity; channel means cooperating with the first bushing for permitting fluid communication between a supply conduit and the cavity when the pin has been displaced by a first predetermined amount; and a shaped portion which is formed on the pin and which is disposed in the cavity to act as a molding pin when the pin has been displaced by a second predetermined amount and wherein the communication between the supply conduit and the cavity is cut-off.

BRIEF EXPLANATION OF THE DRAWINGS

The various features and advantages of the present invention will become more clearly understood as a detailed description of a preferred embodiment is made with reference to the appended drawings in which:

FIG. 6 is an elevational view of a piston and valve gate pin arrangement which forms a vital part of the preferred embodiment of the present invention and which is received in the structure shown in FIG. 5;

FIG. 7 is a cross-sectional view as taken along section line VII—VII of FIG. 6;

FIG. 8 is an elevational view showing a piston which also forms another vital part of the instant embodiment;

DETAILED DESCRIPTION OF THE PREFERRED EMBODIMENT

Figure 1:
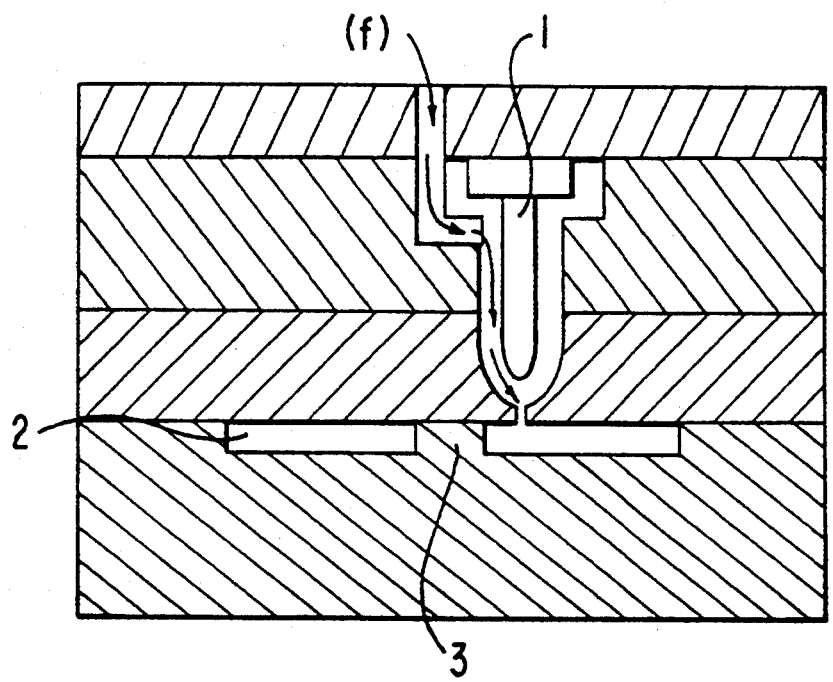
FIGS. 1 and 2 show one of the prior art gating arrangements discussed in the opening paragraphs of this disclosure.
Figure 2:
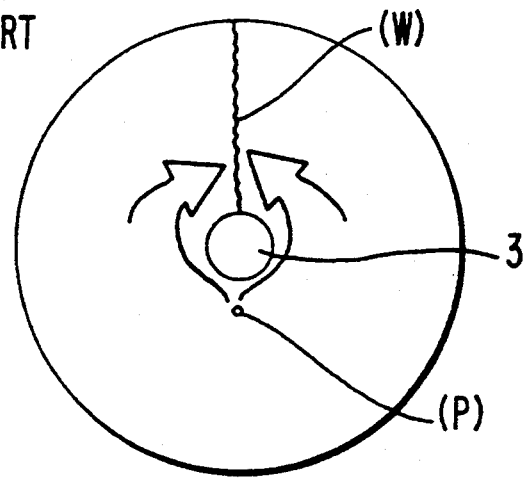
Figure 3:
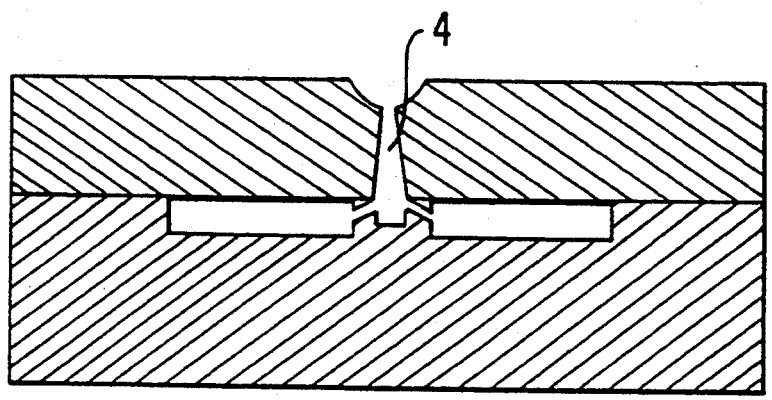
FIGS. 3 and 4 show another prior art gating arrangement discussed in the opening paragraphs of this disclosure.
Figure 4:
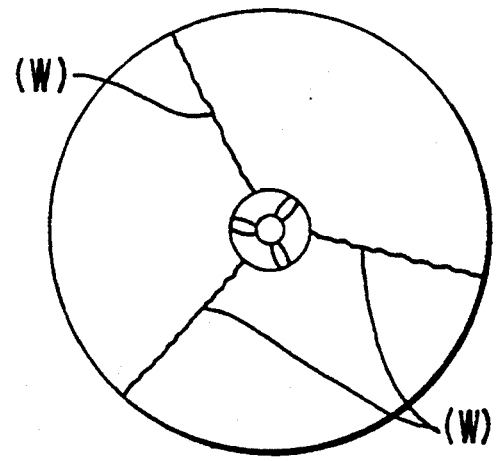
Figure 5:
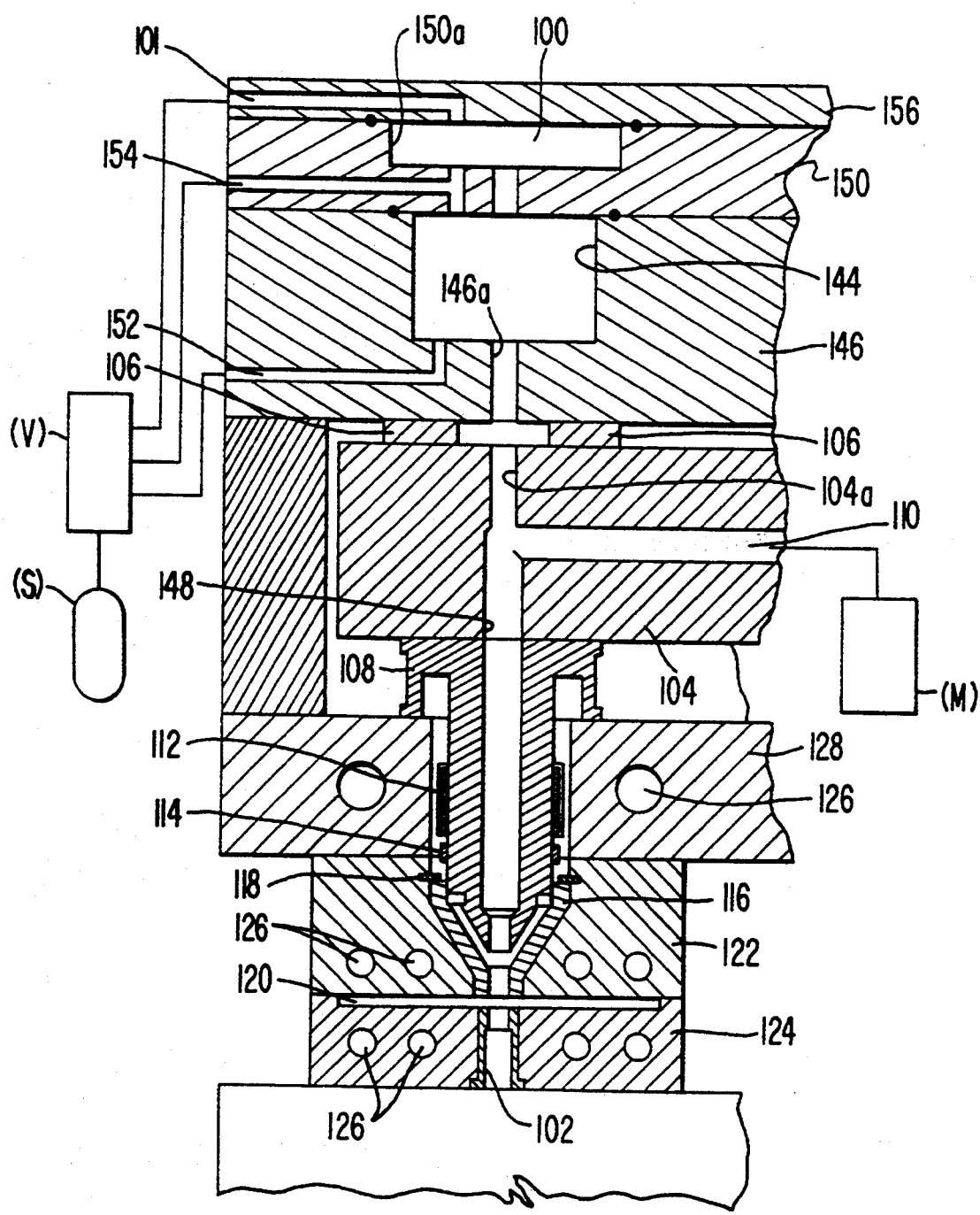
FIG. 5 is a sectional view showing the basic structure of an embodiment of the present invention.

FIGS. 5 to 8 show details of a preferred embodiment of the present invention. FIG. 8 is a sectional view of gated mold wherein the valve gate pin and actuating pistons are removed for illustrative clarity. In this arrangement, a piston chamber 100, pressure port 101 and bushing 102 are modified as compared with the normal valve gate mold design and characterizes the construction of the illustrated embodiment.

In this arrangement, a heated material distribution manifold 104 is thermally isolated from the rest of the mold by standoffs 106 and a nozzle body 108. A material supply channel 110 which extends through the manifold 104 conveys heated plastic material to the nozzle body 108. In this instance, the nozzle body 108 is heated by an electric heating coil or the like type of heating device 112. A thermocouple 114 is used to sense the temperature of the nozzle body 108 and to generate a temperature indicative signal by way of which the amount of heat produced by the heater 112 can be suitably regulated by a control circuit (not shown).

A removable gate bushing 116 is secured in the illustrated position in a mold cavity by a retainer 118. This bushing 116 directs the flow of plastic material into a mold part cavity area 120 which is defined between a mold cavity 122 and a mold core 124.

Cooling channels 126, which are formed in the mold cavity 122, the mold core 124 and structural member 128 through which the nozzle body extends, have a cooling medium pumped therethrough.

FIG. 6 shows a valve gate pin and piston assembly 130 which form a vital part of this embodiment. It should be noted that while the piston 132 and most of the pin 134 are generally fixed in shape and dimensions, the shape and size of a land 134a formed immediately adjacent the end of the pin 134 can be varied in accordance with the size and shape of the aperture which is to be formed. A second land 134b is selected to act as a valve member and is dimensioned to close in the mouth or port of the gate bushing 116 and thus act as a valve member. FIG. 7 shows the manner in which the pin 134 is formed with a plurality of flutes 134c along a major portion of its length.

It should be noted that typical prior art pins are solid in this area.

It should also be noted that an annular recess 134d is formed about the periphery of the pin 134 at a location proximate the end thereof. This recess 134d is formed so as to fluidly communicate with the channels defined by the fluting 134c. The reason for this construction will become more apparent as a discussion of the operation of the embodiment is made with reference to FIGS. 10 to 17.

The bushing 102 which is set in a through bore formed in the mold core 124, is axially aligned with the removable gate bushing 112 and arranged to slidably receive the end of the pin 134 during the molding process.

FIG. 8 shows a piston 140 which cooperates with the valve gate pin and piston assembly. As will be appreciated, the piston 140 has a short piston rod 142 on which sealing rings or the like type of means are disposed. The diameter of the piston 140 is greater than that of the piston 132.

Figure 9:
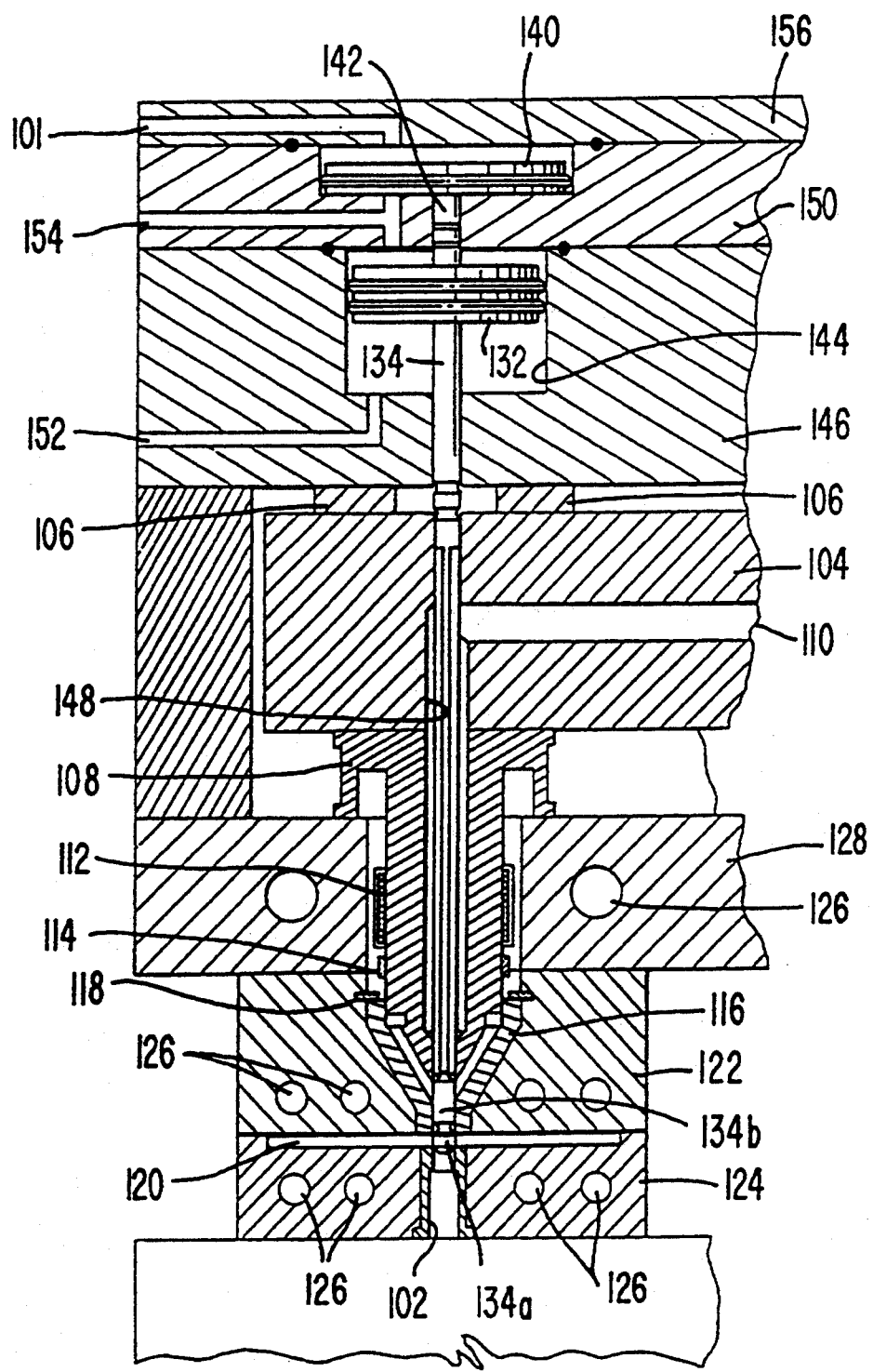
FIG. 9 shows the embodiment of the present invention in a fully assembled condition.

FIG. 9 shows the pin and piston assembly 130 and piston 140 installed in the mold system. In this figure, the pistons 132, 140 are illustrated in what shall be referred to as "intermediate" positions. As will be appreciated from this figure, the gate pin and piston assembly 130 are disposed such that the piston 132 is received in a cylindrical bore formed in a structural member 146, while the pin portion 134 extends through elongate bores 146a, 104a (see FIG. 5) into an elongate stepped bore 148.

The cylindrical bore 144 is closed by a structural member 150 in which a stepped bore 150a is formed. This stepped bore 150a is formed such that the smaller diameter portion thereof fluidly communicates the chamber which is defined between the bore 144 and the structural member 150.

Piston 140 is disposed in the stepped bore 150a so that the short piston rod 142 which extends from the lower face thereof, extends through the smaller portion of the stepped bore 150a and is permitted to be projectable into the chamber in which piston 132 is disposed. The sealing rings on the rod 142 engage the walls of the smaller diameter portion of the stepped bore 150a thus establishing an effective pressure seal between the bores 144, 150a in which the pistons 132, 140 are disposed.

A port 152 fluidly communicates with the lower section of the cylindrical bore 144 while a port 154, which is formed in the structural member 150 is arranged to communicate with the upper end of the bore 144 and the lower end of the stepped bore 150a. The upper end of the stepped bore 150a is closed by a cap member 156 in which port 101 is formed. This port 101 fluidly communicates with the upper portion of the chamber defined in the stepped bore 150a by the cap member 156.

The ports 101, 152 and 154 are communicated with a source (S) of fluid under pressure by way of a valve arrangement (V). This valve arrangement (V) enables the ports 101, 152 and 154 to be selectively communicated with the source of pressurized fluid or with the atmosphere.

OPERATION

The operation of the device described above will now be given with reference to FIGS. 10 to 17.

Figure 10:
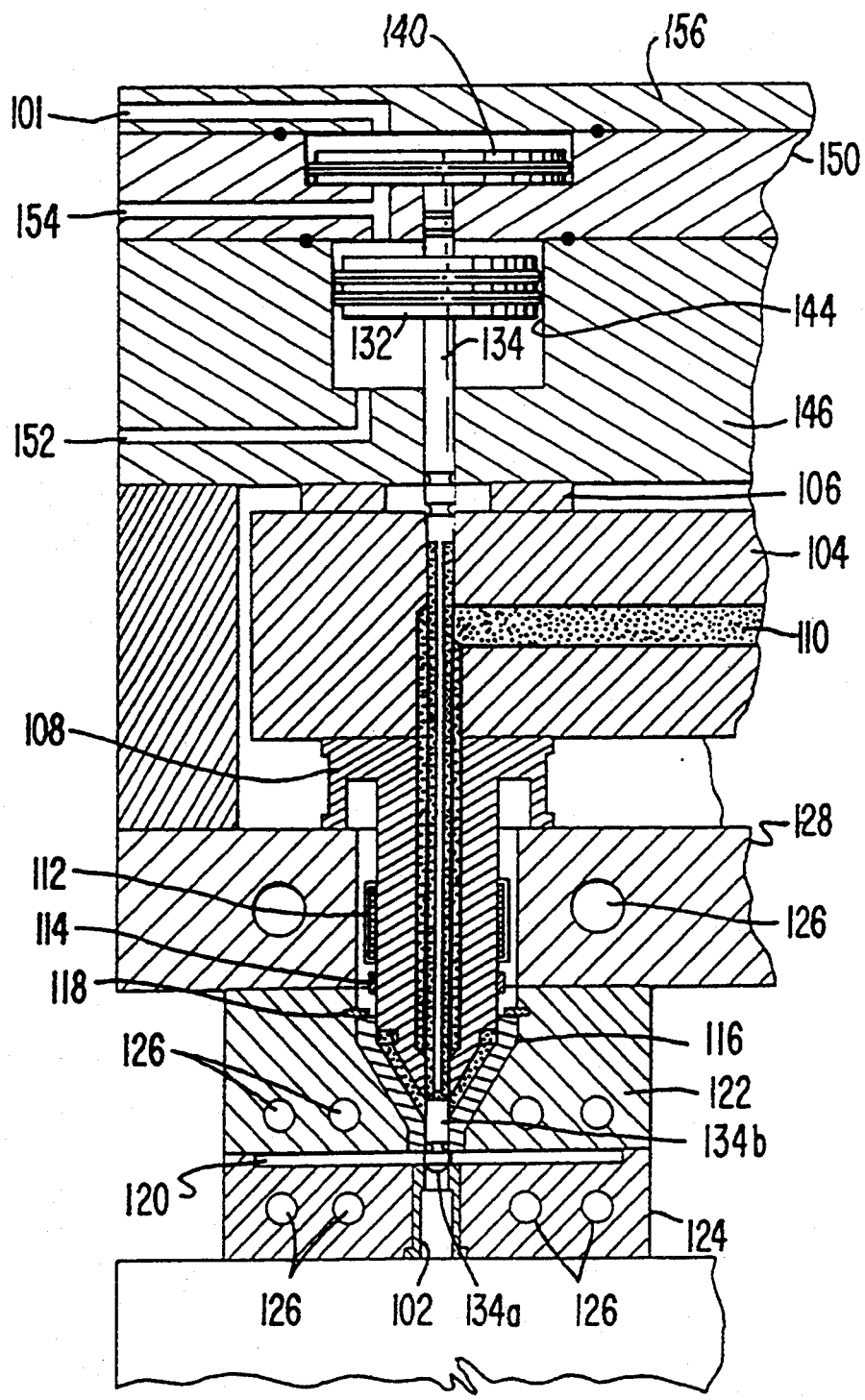
FIGS. 10 to 17 show the embodiment of the invention in various stages of operation.

FIG. 10 shows the situation wherein molten plastic (indicated by the dark shaded areas) has been supplied into the supply channel 110 and into the annular space defined between the pin 134 and the wall of the elongate stepped bore 148, by a molding machine (M). Note that the molding machine is schematically illustrated in block diagram form for simplicity.

At this stage, the same air or fluid pressure is supplied to the ports 101 and 152. This induces the pistons 132, and 140 to move to their respective first restricted positions. Viz., as the pressures applied are equal, the piston 140 is moved to the bottom of the stepped bore 150a in which it is reciprocally disposed and conditioned to assume a position wherein the short piston rod 142, which extends from the lower surface thereof, projects into bore 144, engages the top of the piston 132, and displaces it downwardly by a predetermined distance against oppositely acting the pressure being supplied via port 152.

Figure 11:
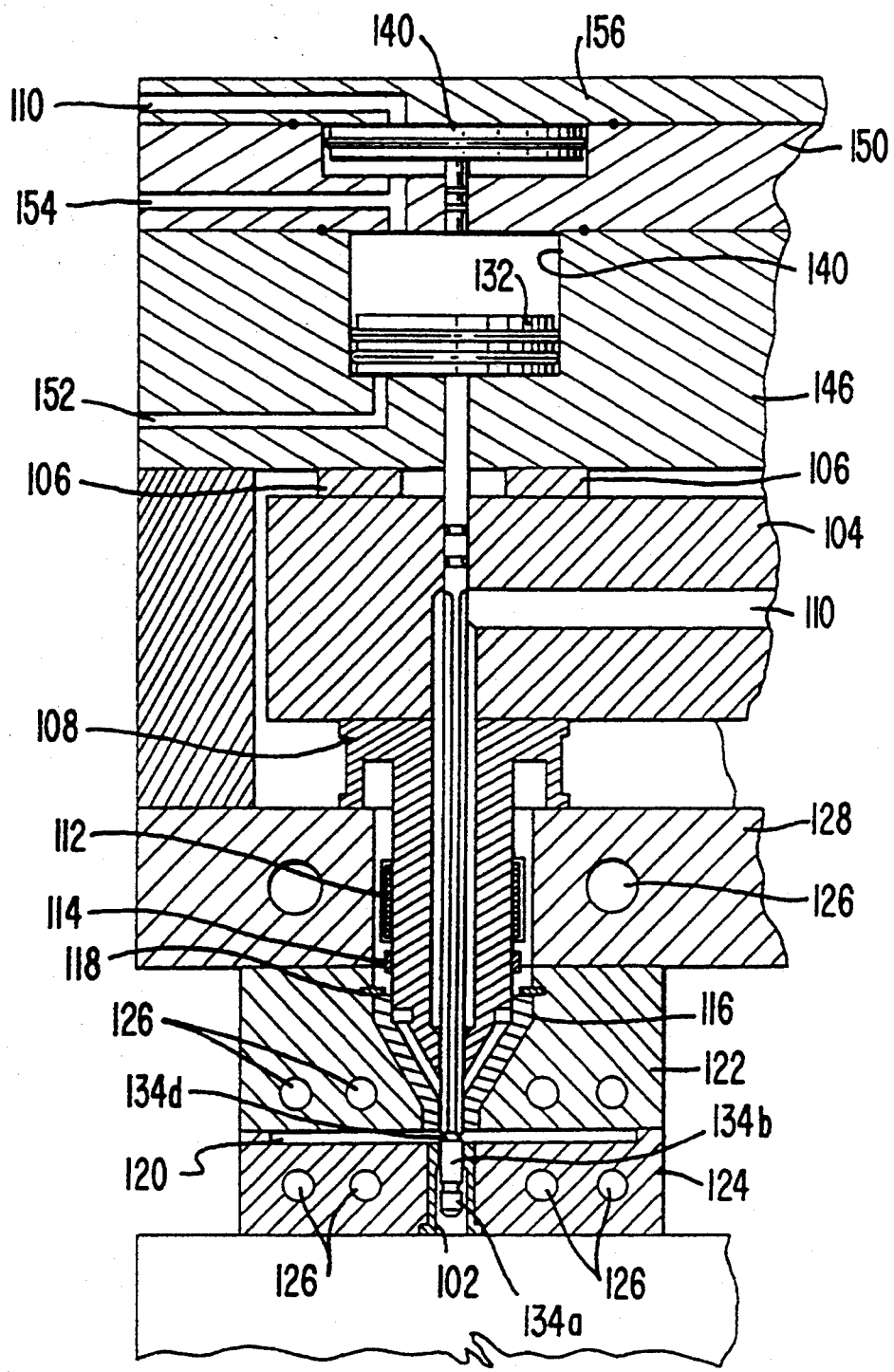
Figure 12:
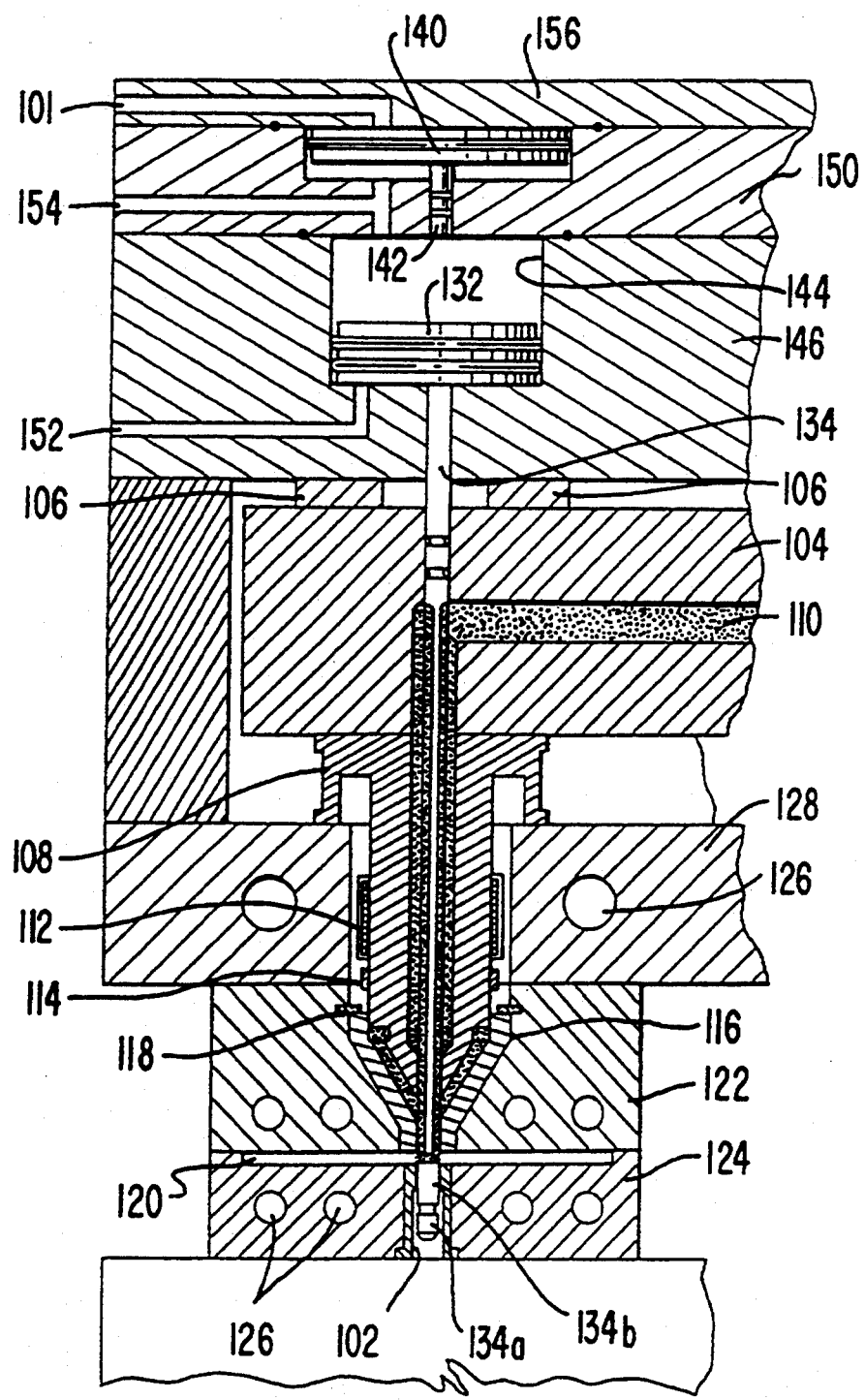

FIG. 11 (no molten plastic material is illustrated for clarity) illustrates the situation wherein the pistons 132 and 140 are moved to their respective "projected" positions. This is achieved by venting the ports 152 and 101 to the atmosphere and applying a fluid pressure to the port 154. Under these conditions, the pistons 132 and 140 are moved to their second respective restricted positions. Viz., as shown, the piston 132 is driven to the bottom of the bore 144 while the piston 140 is moved to the top of the stepped bore 150a. In this state, the pistons 132, 140 assume a maximally separated condition. The pin 134 is displaced downwardly and is guided into the core block 124 and is guidingly received in the bushing 102.

Next, with the pin 134 maintained in this position (FIGS. 12 and 13), the molding machine injects molten plastic under pressure down along the fluting and into the molded part cavity area 120 by way of the annular recess 134d formed near the lower end of the pin.

Figure 13:
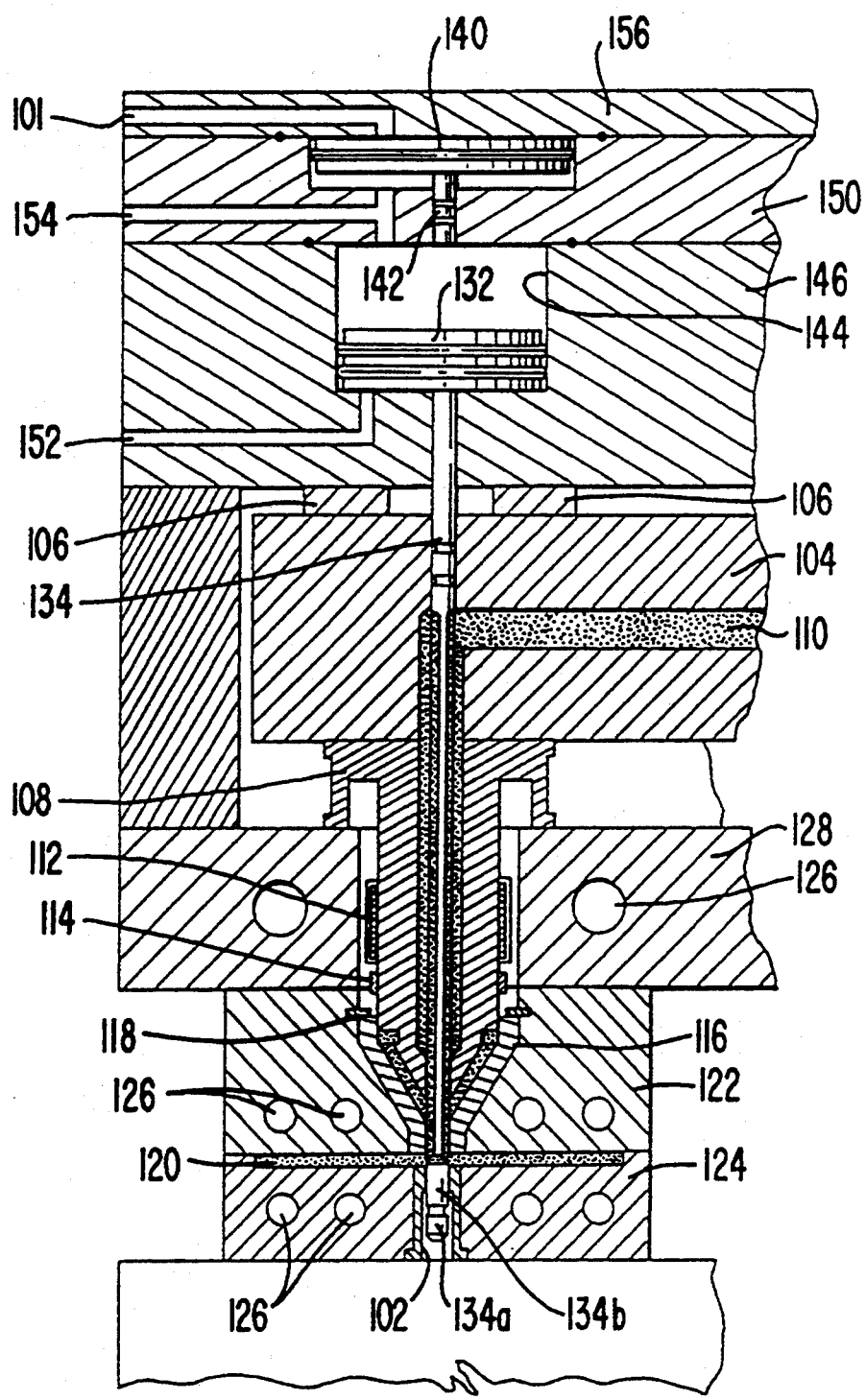
Figure 14:
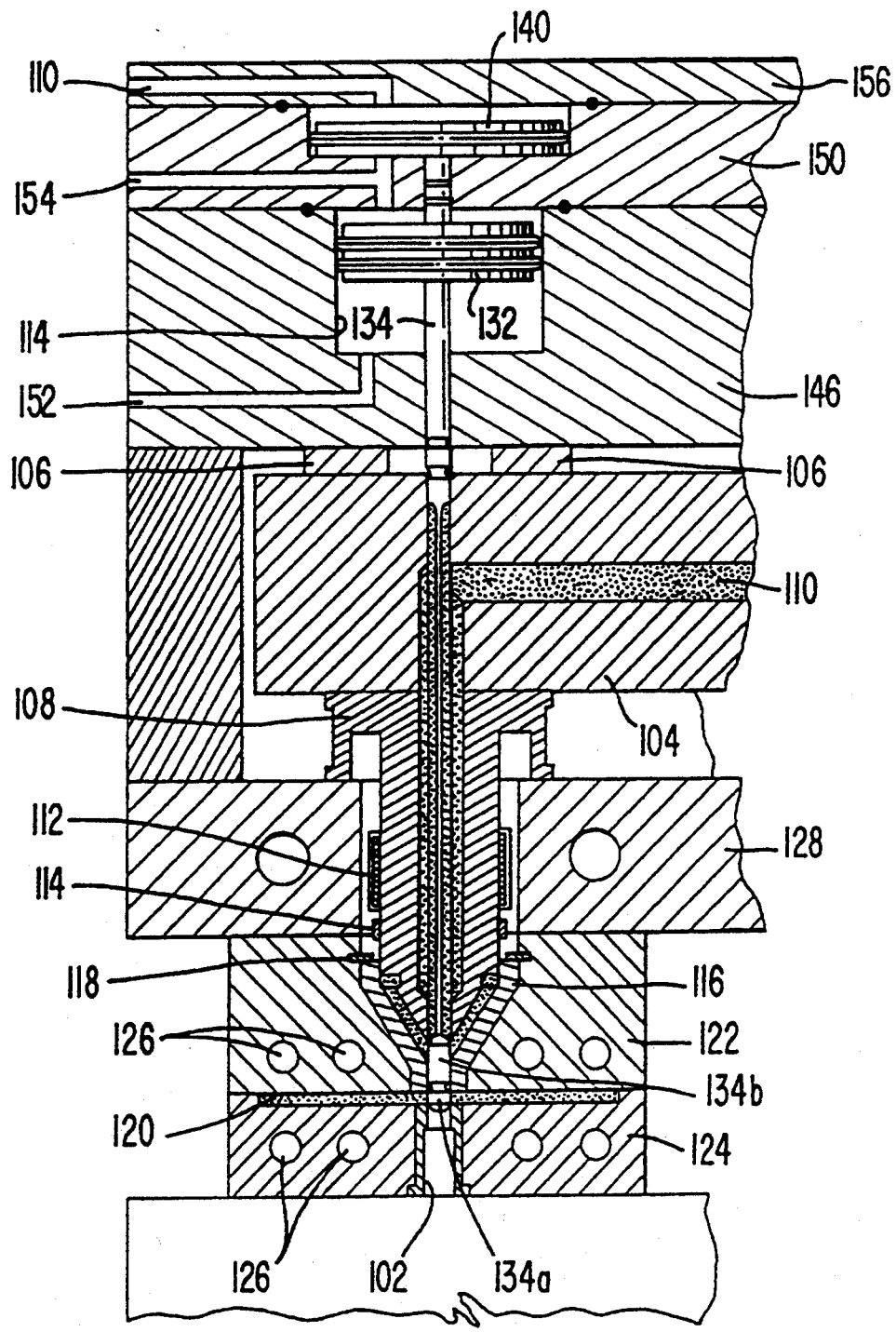

After the cavity 120 is completely filled in the manner illustrated in FIG. 13, the port 154 is vented to the atmosphere and fluid pressure is supplied to the ports 101 and 152. This moves the pistons 132 and 140 back to their respective "intermediate" positions and induces the land 134b provided at the lower end of the pin 134, to be positioned in a central portion of the cavity in the manner illustrated in FIG. 14. In this position, the land 134b acts as a molding pin.

Cooling media which flows through the coolant conduits 126 cools the cavity 122 and the core 124 and induces the plastic in the cavity area 120 to solidify about the land 134b and thus bring about the formation of a clean hole in the center of the molded part. Further, as the pin 134 has been retracted to the degree that fluid communication between the annular space or recess 134d and the cavity 120 is cut-off, the opening through which the plastic was injected into the cavity is completely eliminated and no unsightly marks result at the site where the plastic was injected into the cavity.

Figure 15:
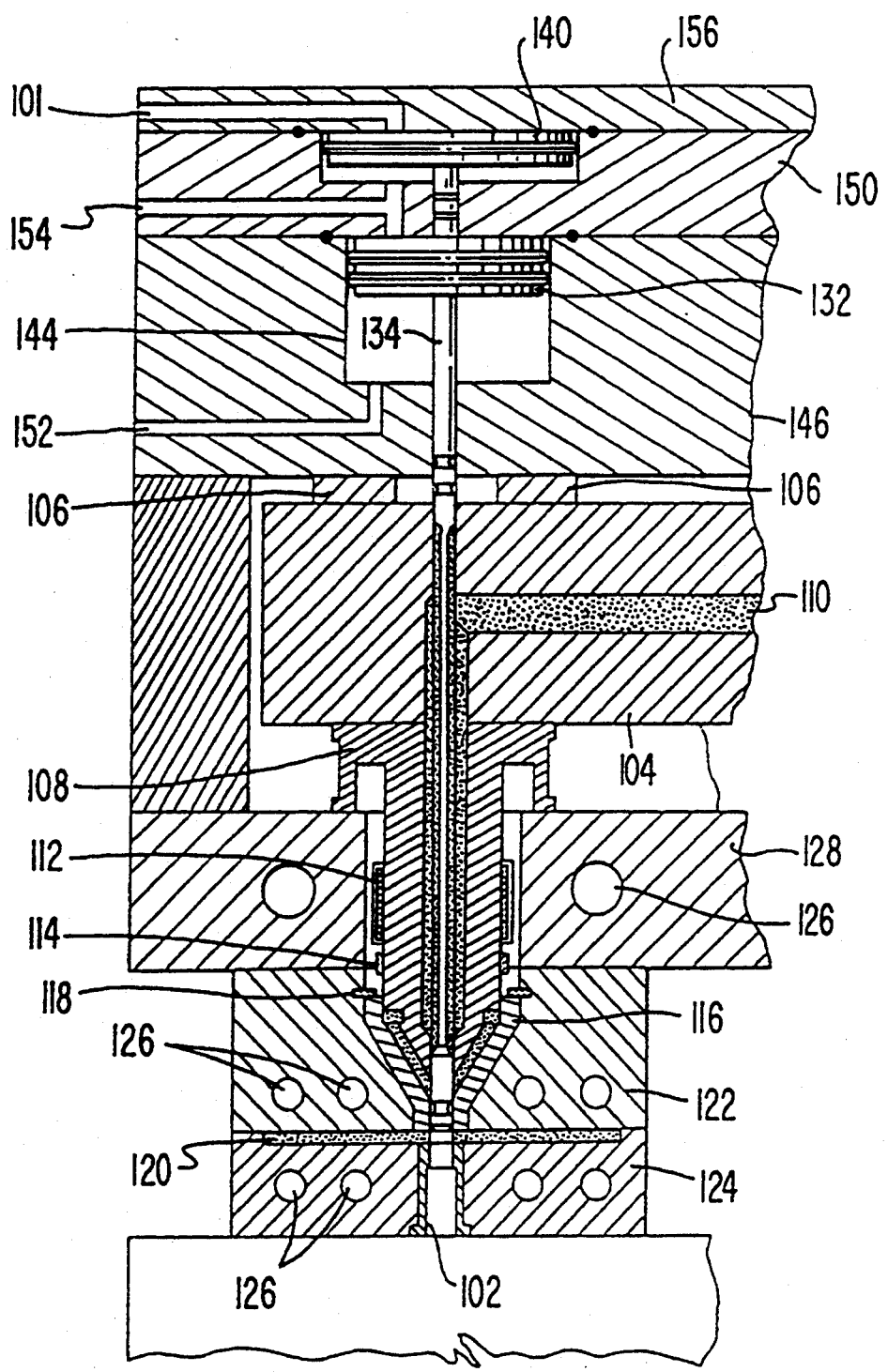

As shown in FIG. 15, after the plastic has solidified in the cavity area 120, the ports 101 and 154 are vented to the atmosphere while pressure continues to be supplied to the port 152. As a result, the pistons 132 and 140 are moved to their "retracted" positions. This results in the pin 134 being removed from the cavity area 120 leaving a cleanly formed opening in the molded part.

Figure 16:
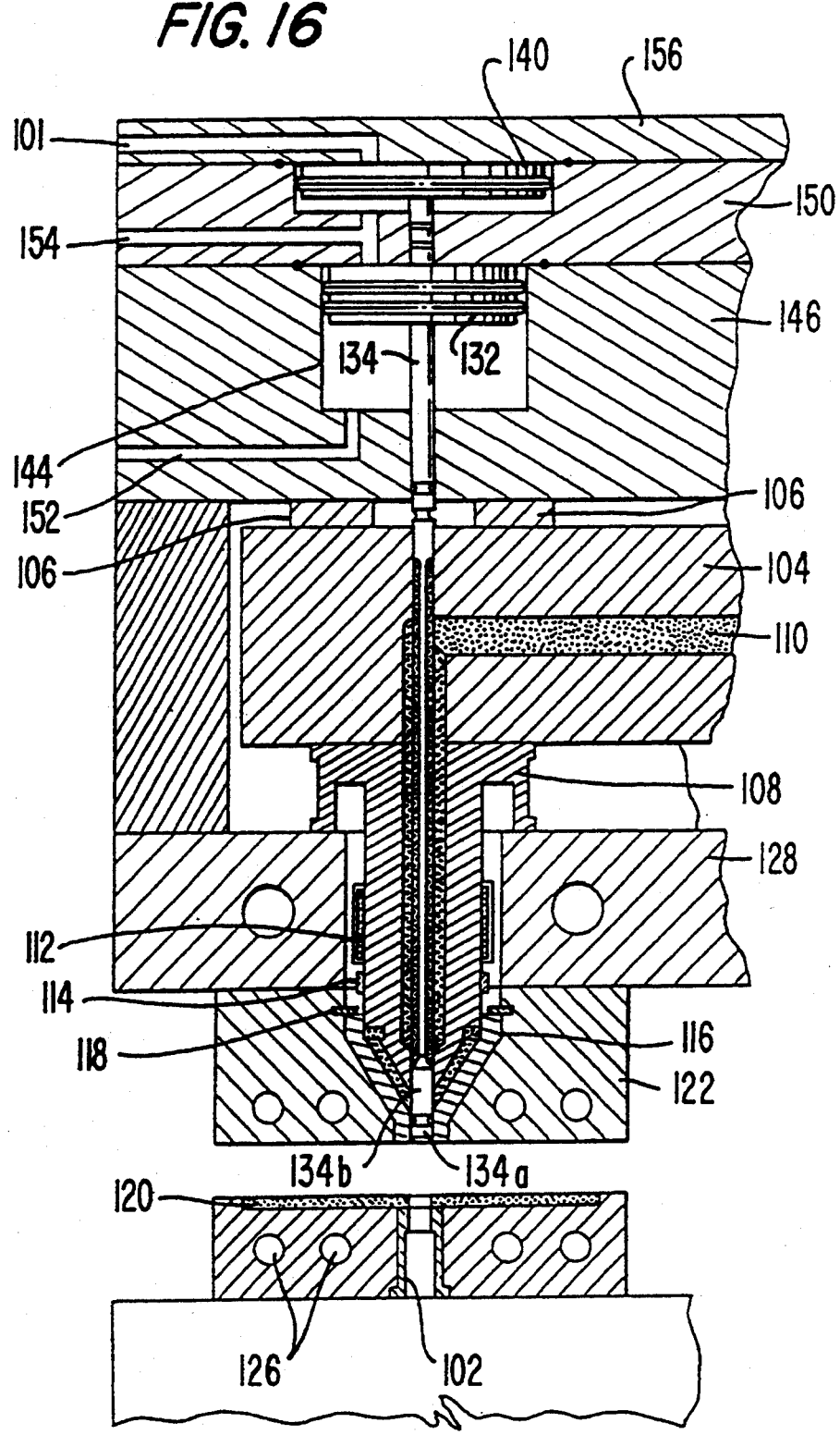
Figure 17:
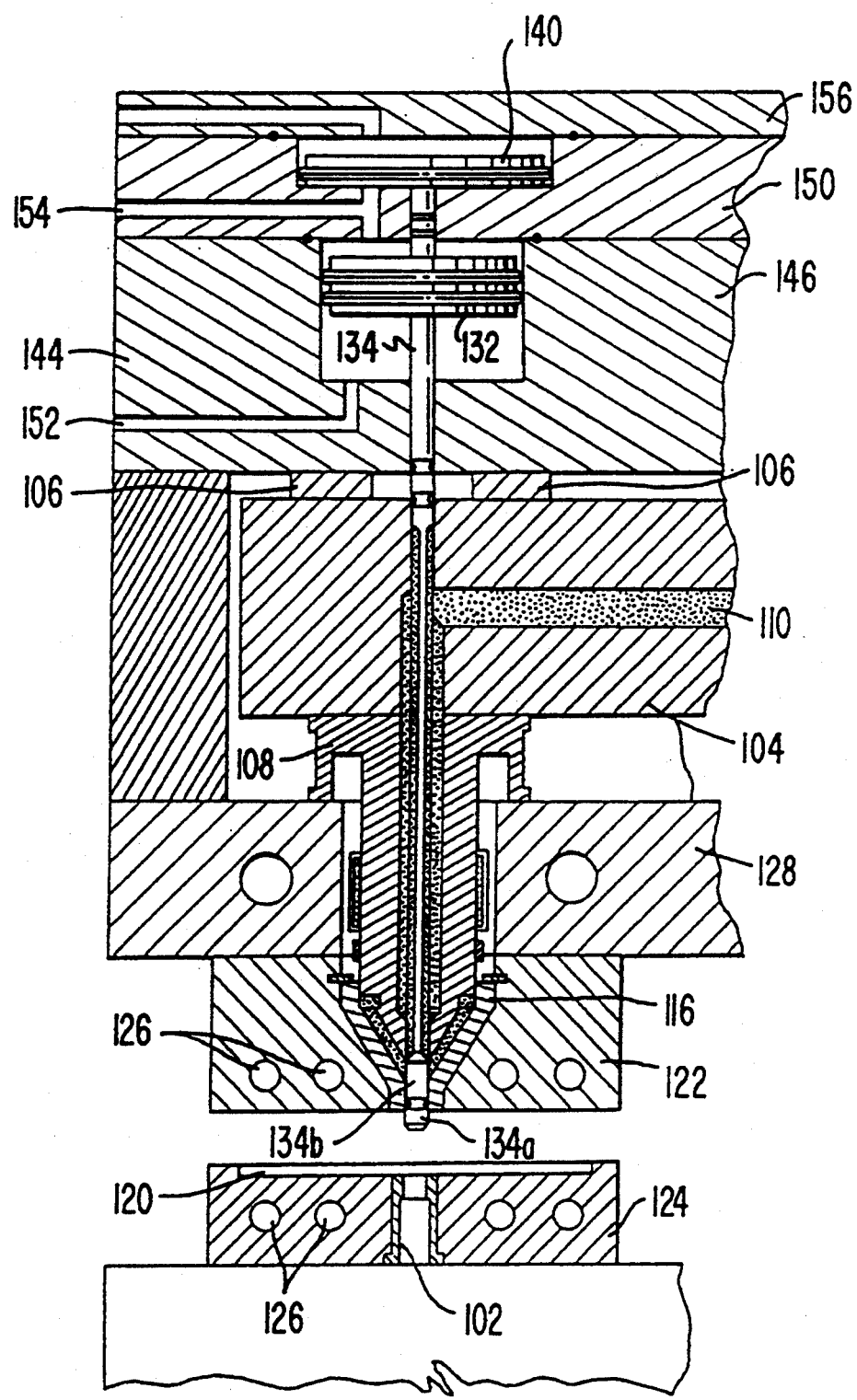

FIG. 16 shows the situation wherein the moving side of the mold arrangement is lowered away from the upper stationary section. FIG. 17 shows the situation after the plastic part is ejected from the core by way of a conventional technique.

Following the ejection, the mold halves (viz., the mold core 124 and the mold cavity 122) are moved back into engagement with one another and fluid pressure is supplied to the port 101 while the pressure is maintained at the port 152. The port 154 is vented to the atmosphere. Under these conditions, the pistons 132, 140 are returned to their "intermediate" positions (viz., the positions illustrated in FIG. 9) in readiness for the next molding cycle.

While the present invention has been disclosed with reference to only a single embodiment, it will be realized that many changes and/or modifications can be made thereto without departing from the scope of the present invention. For example, the invention is not limited to the use of pistons and this servo arrangement can be replace with any other suitable mechanism. Viz., a crank or cam actuated type servo could readily be used in place of the dual piston arrangement disclosed in detail above.

What is claimed is:

1. A molding device comprising,
   means defining a cavity in which a part can be molded;
   a reciprocal pin;
   a land formed at a location proximate an end of said pin, said land being so shaped and sized so that when said pin assumes a first predetermined position, said land cooperates with said cavity in a manner wherein said land acts as a molding pin and forms an aperture in a part which is formed by injecting a flow of molten material into said cavity;
   channel means formed on said pin, said channel means allowing a flow of said molten material to enter said cavity when said pin assumes a second predetermined position; and
   servo means operatively connected with said pin for selectively moving said pin between said first and second predetermined positions, said servo means comprising:
   a first piston which is connected to said pin, said first piston being disposed in a first bore;
   a second piston which is disposed in a second bore, said second bore communicating with said first bore, said second piston having a piston rod which projects into said first bore so as to be engageable with the top of said first piston; and
   port means for enabling fluid pressure to be selectively supplied into said first and second bores.

2. A molding device as claimed in claim 1, wherein said port means comprises:
- a first port which fluidly communicates with said second bore, the pressure which is introduced through said first port into said second bore acting on said second piston in a manner which produces a bias which tends to move said second piston in a first direction;
- a second port which fluidly communicates with said first and second bores, the pressure which is introduced into said first and second bores via said second port acting on said first piston in a manner which produces a bias which tends to move said first piston in said first direction and acting on said second piston in a manner which produces a bias which tends to move said second piston in a second direction which is opposite said first direction; and
- a third port which fluidly communicates with said first bore, where the pressure which is introduced into said first bore via said third port acting on said first piston in a manner wherein a bias is produced which tends to move said first piston in said second direction.

3. A molding device as claimed in claim 2, wherein the diameter of said second piston is greater than that of said first piston.

4. A molding device as claimed in claim 2, wherein when said first and second pistons are exposed to the same pressure, said second piston produces a larger force and said first piston.

5. A molding device as claimed in claim 1, wherein said cavity comprises:
- a first body;
- a second body;
- means defining a shaped recess in one of said first and second bodies which defines said cavity when said first and second bodies are pressed together;
- a first bushing supported in said first body which can receive said pin; and
- a second bushing supported in said second body which can receive said pin;
- said first bushing cooperating with said channel means to cut-off communication between said channel means and said cavity until said pin has been moved to said second predetermined position.

6. A molding device as claimed in claim 5, wherein said first bushing is removably secured in a recess formed in said first body.

7. A molding device as claimed in claim 5, wherein a nozzle body which is selectively heated by a heating means, is received in an opening formed in said first bushing, said nozzle body having a bore through which said pin extends to define an annular channel through which a flow of molten material can pass.

8. A molding device as claimed in claim 7, wherein said nozzle body cooperates with a thermally isolated distribution manifold.

9. A molding device comprising,
- an axially displaceable pin;
- a first bushing disposed on a first side of a cavity which is defined between first and second structural elements which are relatively movable with respect to one another, said first bushing being disposed in said first structural member and adapted to guide said pin into said cavity;
- a second bushing adapted to receive said pin after said pin has been displaced by a predetermined amount through said cavity, said second bushing being disposed with said second structural member and on a second side of said cavity;
- channel means cooperating with said first bushing for permitting fluid communication between a supply conduit and said cavity when said pin has been displaced by a first predetermined amount;
- a shaped portion which is formed on said pin and which is disposed in said cavity to act as a molding pin when said pin has been displaced by a second predetermined amount to a position wherein the communication between said supply conduit and said cavity is cut-off; and
- servo means operatively connected with said pin for selectively displacing said pin by said first and second predetermined amounts, said servo means comprising:
- a first piston which is connected to said pin, said first piston being disposed in a first bore;
- a second piston which is disposed in a second bore, said second bore communicating with said first bore, said second piston having a piston rod which projects into said first bore so as to be engageable with the top of said first piston; and
- port means for enabling fluid pressure to be selectively supplied into said first and second bores.

10. A molding device as claimed in claim 9, further comprising an injection nozzle which is disposed with said first bushing and which includes a passage which forms part of said supply conduit.

11. A molding device as claimed in claim 10, further comprising heating means associated with said injection nozzle.

12. A molding device as claimed in claim 11, further comprising sensor means disposed with said injection nozzle for sensing the temperature of said nozzle and for producing a signal with which said heating means is controlled.

13. A molding device as claimed in claim 9, wherein said pin is formed with fluting along a predetermined length thereof, said fluting forming part of said channel means.

14. A molding device as claimed in claim 13, wherein said pin is formed with an annular recess, said annular recess forming part of said channel means and cooperating with said fluting to permit the fluid communication to be established between said cavity and said supply conduit.

* * * * *